US011023778B2

(12) United States Patent
Walters et al.

(10) Patent No.: US 11,023,778 B2
(45) **Date of Patent: *Jun. 1, 2021**

(54) TECHNIQUES TO EMBED A DATA OBJECT INTO A MULTIDIMENSIONAL FRAME

(71) Applicant: Capital One Services, LLC, McLean, VA (US)

(72) Inventors: Austin Grant Walters, Savoy, IL (US); Jeremy Edward Goodsitt, Champaign, IL (US); Mark Louis Watson, Urbana, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,907

(22) Filed: Nov. 1, 2019

(65) Prior Publication Data

US 2020/0356817 A1 Nov. 12, 2020

Related U.S. Application Data

(63) Continuation of application No. 16/409,140, filed on May 10, 2019, now Pat. No. 10,504,005.

(51) Int. Cl.
*G06K 9/62* (2006.01)
*G06N 5/02* (2006.01)
(Continued)

(52) U.S. Cl.
CPC ......... *G06K 9/6257* (2013.01); *G06K 9/6247* (2013.01); *G06K 9/6298* (2013.01);
(Continued)

(58) Field of Classification Search
CPC ........ G06K 9/6232; G06N 3/08; G06N 3/082; G06N 3/084; G06N 5/003
See application file for complete search history.

(56) References Cited

U.S. PATENT DOCUMENTS

2005/0004904 A1* 1/2005 Kearney ............... G06F 16/283
2008/0285867 A1* 11/2008 Kajiwara ............. H04N 19/593 382/233

(Continued)

OTHER PUBLICATIONS

"Nonlinear Dimensionality Reduction by Locally Linear Embedding," Sam T. Roweis and Lewrence K. Saul, Science vol. 290 Dec. 22, 2000, DOI: 10.1126/science.290.5500.2323, pp. 2323-2326 (Year: 2000).*

(Continued)

*Primary Examiner* — Hal Schnee
(74) *Attorney, Agent, or Firm* — Kacvinsky Daisak Bluni PLLC

(57) ABSTRACT

Various embodiments are generally directed to techniques for embedding a data object into a multidimensional frame, such as for training an autoencoder to generate latent space representations of the data object based on the multidimensional frame, for instance. Additionally, in one or more embodiments latent space representations of data objects may be classified, such as with a machine learning algorithm. Some embodiments are particularly directed to embedding a data object comprising a plurality of object entries into a three-dimensional (3D) frame.

20 Claims, 12 Drawing Sheets

200D

(51) Int. Cl.
*G06N 3/08* (2006.01)
*G06N 20/00* (2019.01)

(52) U.S. Cl.
CPC ............... *G06N 3/08* (2013.01); *G06N 5/027* (2013.01); *G06N 20/00* (2019.01)

(56) References Cited

U.S. PATENT DOCUMENTS

| | | | | |
|---|---|---|---|---|
| 2012/0290324 | A1* | 11/2012 | Ribbing | G06F 19/321 705/3 |
| 2018/0089762 | A1* | 3/2018 | Lopez de Prado | G06N 5/003 |
| 2018/0300633 | A1* | 10/2018 | McBride | G06F 1/324 |
| 2018/0338147 | A1* | 11/2018 | Nowozin | H04N 19/149 |
| 2019/0220704 | A1* | 7/2019 | Schulz-Trieglaff | G16B 20/20 |
| 2019/0303465 | A1* | 10/2019 | Shanmugamani | G06F 16/2237 |
| 2020/0099954 | A1* | 3/2020 | Hemmer | G06T 9/004 |

OTHER PUBLICATIONS

"Kernelization of Tensor-Based Models for Multiway Data Analysis: Processing of Multidimensional Structured Data," Qibin Zhao, Guoxu Zhou, Tulay Adali, Liqing Zhang, and Andrzej Cichocki, IEEE Signal Processing Magazine, vol. 30, Issue: 4, Jul. 2013), DOI: 10.1109/MSP.2013.2255334, pp. 137-148 (Year: 2013).*

* cited by examiner

100

200A

200B

200C

200D

300

100

| |
|---|
| Identify a data object comprising a set of object entries, wherein each object entry in the set of object entries include data indicative of a row value, a column value, and cell contents<br>502 |

↓

| |
|---|
| Generate a multidimensional frame based on the data object, the multidimensional frame comprising a row dimension, a column dimension, and a contents dimension, wherein at least one row value is mapped onto the row dimension, at least one column value is mapped onto the column dimension, and at least one cell contents is mapped along the contents dimension to generate the multidimensional frame<br>504 |

↓

| |
|---|
| Utilize a trained encoder to embed the multidimensional frame into a latent space representation of the multidimensional frame, wherein the trained encoder is trained with a machine learning model to generate latent space representations of multidimensional frames, and a respective latent space representation generated with the trained encoder based on a respective multidimensional frame enables creation of an approximation of the respective multidimensional frame with a decoder<br>506 |

↓

| |
|---|
| Compute a set of correlation scores based on the latent space representation of the multidimensional frame, wherein each correlation score in the set of correlation scores corresponds to a different latent space representation of a different multidimensional frame generated based on a different data object<br>508 |

↓

| |
|---|
| Compare the set of correlation scores to a correlation threshold to identify a set of correlated latent space representations<br>510 |

↓

| |
|---|
| Identify a set of correlated data objects based on the set of correlated latent space representations<br>512 |

↓

| |
|---|
| Provide the set of correlated data objects as output<br>514 |

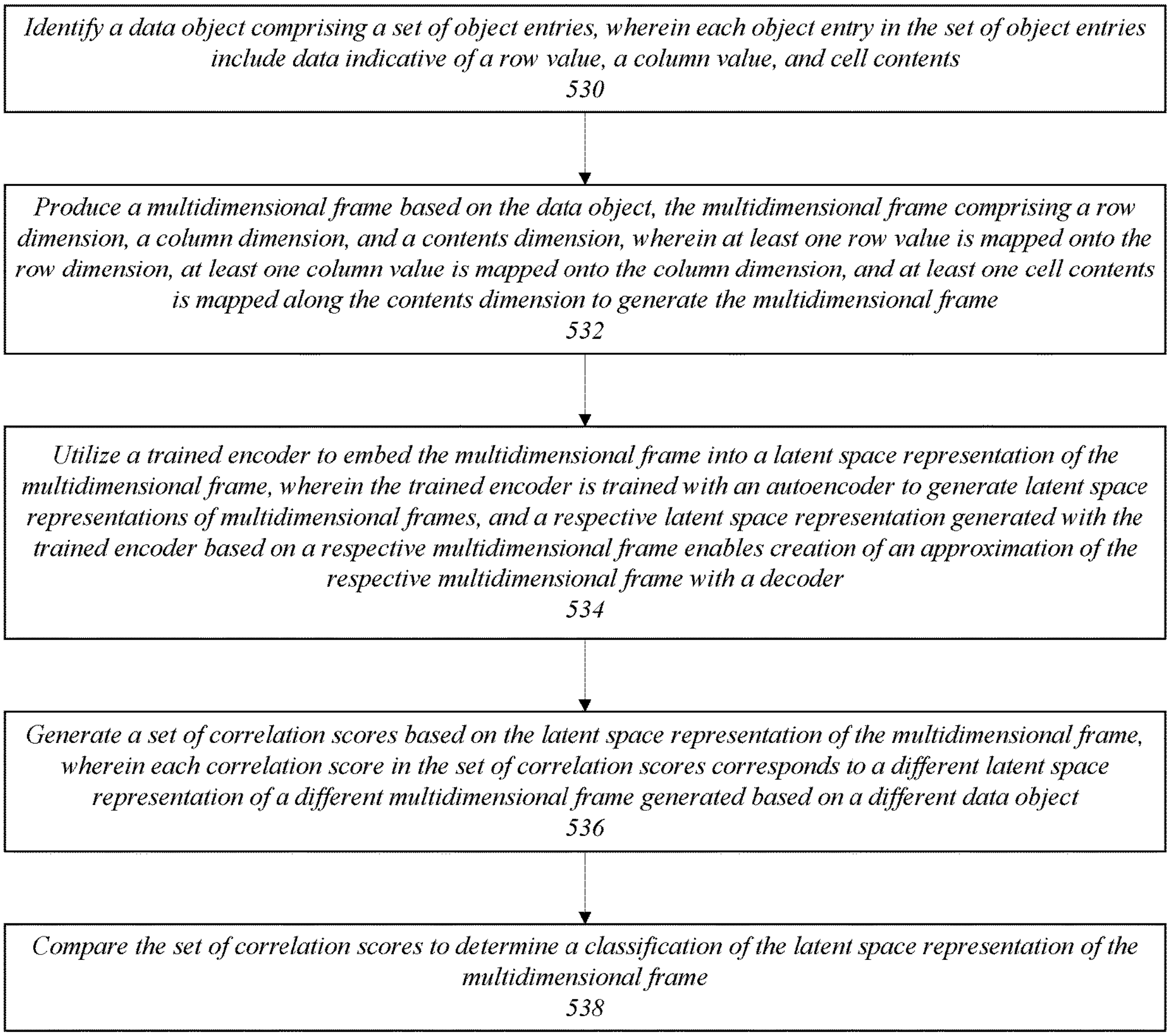

FIG. 5B
500B

| Identify a data object comprising a set of object entries, wherein each object entry in the set of object entries include data indicative of a row value, a column value, and cell contents |
|---|
| 530 |

↓

| Produce a multidimensional frame based on the data object, the multidimensional frame comprising a row dimension, a column dimension, and a contents dimension, wherein at least one row value is mapped onto the row dimension, at least one column value is mapped onto the column dimension, and at least one cell contents is mapped along the contents dimension to generate the multidimensional frame |
|---|
| 532 |

↓

| Utilize a trained encoder to embed the multidimensional frame into a latent space representation of the multidimensional frame, wherein the trained encoder is trained with an autoencoder to generate latent space representations of multidimensional frames, and a respective latent space representation generated with the trained encoder based on a respective multidimensional frame enables creation of an approximation of the respective multidimensional frame with a decoder |
|---|
| 534 |

↓

| Generate a set of correlation scores based on the latent space representation of the multidimensional frame, wherein each correlation score in the set of correlation scores corresponds to a different latent space representation of a different multidimensional frame generated based on a different data object |
|---|
| 536 |

↓

| Compare the set of correlation scores to determine a classification of the latent space representation of the multidimensional frame |
|---|
| 538 |

500C

600

700

TECHNIQUES TO EMBED A DATA OBJECT INTO A MULTIDIMENSIONAL FRAME

BACKGROUND

Typically, a data file refers to a computer file which stores data to be used by a computer application or system. The data within the computer file can include further divisions or groupings. For example, a data file may include a set of samples or a set of data objects. A data object can refer to a region of storage (e.g., a portion of a data file) that contains one or more values, such as group of values and/or one or more hierarchies of grouped values. An embedding, on the other hand, can refer to a mapping of a discrete variable to a vector of continuous numbers. Sometimes, embeddings are provided as input to train a machine learning model.

RELATED APPLICATIONS

This application is a continuation of U.S. patent application Ser. No. 16/409,140, titled "TECHNIQUES TO EMBED A DATA OBJECT INTO A MULTIDIMENSIONAL FRAME" filed on May 10, 2019. The contents of the aforementioned application are incorporated herein by reference.

BRIEF DESCRIPTION OF THE DRAWINGS

FIGS. 5A-5C illustrate exemplary logic flows according to one or more embodiments described here.

DETAILED DESCRIPTION

Figure 1:
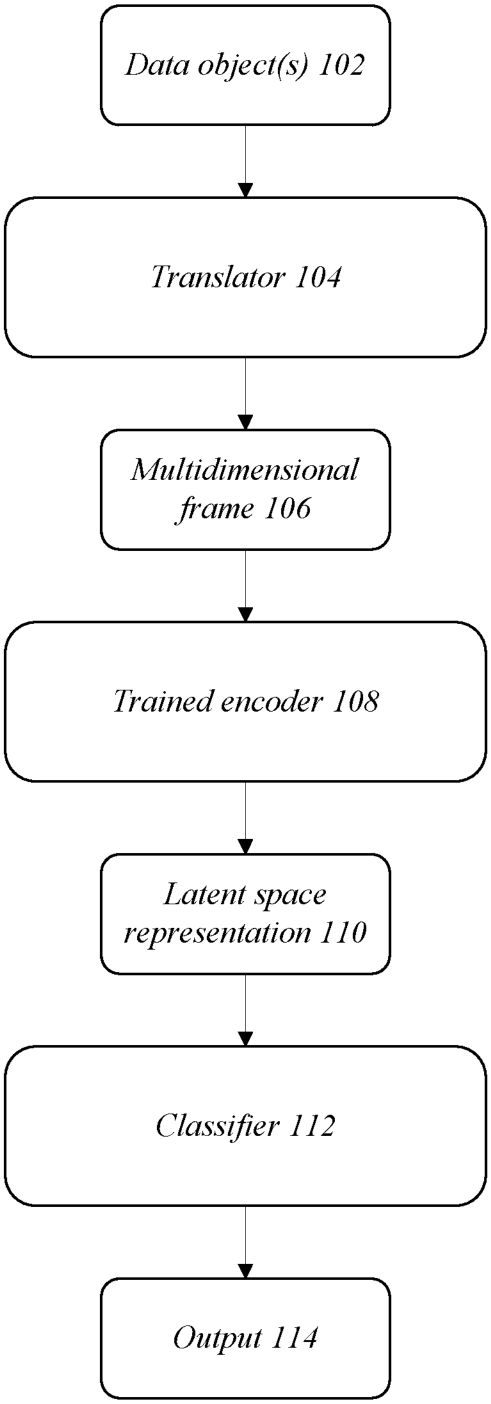
FIG. 1 illustrates an exemplary operating environment according to one or more embodiments described herein.

Various embodiments are generally directed to techniques for embedding a data object into a multidimensional frame, such as for training an autoencoder to generate latent space representations of the data object based on the multidimensional frame, for instance. Additionally, in one or more embodiments latent space representations of data objects may be classified, such as with a machine learning algorithm. Some embodiments are particularly directed to embedding a set of data objects that each include a plurality of object entries into a three-dimensional (3D) frame. For instance, each data object in the set of data objects may correspond to a row value and each object entry of each data object may correspond to a column value. These and other embodiments are described and claimed.

In one embodiment, for example, an apparatus may comprise a processor and memory comprising instructions that when executed by the processor cause the processor to perform one or more of the following. In various embodiments, the processor may identify a data object comprising a set of object entries. In various such embodiments, each object entry in the set of object entries may include data indicative of a row value, a column value, and cell contents. In several embodiments, the processor may generate a multidimensional frame comprising a row dimension, a column dimension, and a contents dimension based on the data object. In several such embodiments, the row value may be mapped onto the row dimension, the column value may be mapped onto the column dimension, and the cell contents may be along onto the contents dimension to generate the multidimensional frame. In many embodiments, the processor may utilize a trained encoder to embed the multidimensional frame into a latent space representation of the multidimensional frame. In many such embodiments, the trained encoder may be trained with a machine learning model to generate latent space representations of multidimensional frames, wherein a respective latent space representation generated with the trained encoder based on a respective multidimensional frame enables creation of an approximation of the respective multidimensional frame with a decoder.

In various embodiments, the processor may compute a set of correlation scores based on the latent space representation of the multidimensional frame. In various such embodiments, each correlation score in the set of correlation scores may correspond to a different latent space representation of a different multidimensional frames generated based on a different data object. In some embodiments, the processor may compare the set of correlation scores to a correlation threshold to identify a set of correlated latent space representations. In many embodiments, the processor may identify a set of correlated data objects based on the set of correlated latent space representations. In one or more embodiments, the processor may provide the set of correlated data objects as output.

Some challenges facing data objects include classifying, correlating, and/or profiling them, such as with respect to other data objects. For instance, vast quantities of data objects may be generated as part of enterprise operations. However, oftentimes, the data objects are never correlated with other data object or require extensive manual analysis to correlate them with other data objects. For example, data objects may only be manually correlated with a few data objects known to a small group of people, such as data objects generated/correlated by a team of people for a specific and narrow purpose. Further, these correlations and/or data objects may not be communicated outside of the team, causing the correlations and/or data objects to be lost once the specific and narrow purpose is completed. Adding further complexity, numerous small groups may independently operate within an enterprise with little to no communication therebetween, further complicating correlating data objects and limiting the opportunity for correlating data objects. These and other factors may result in lost efficiencies and underutilization of data objects, resulting in data objects with reduced applicability and poor adaptability. Such limitations can drastically reduce the usability data objects, contributing to lost economies of scale, excessive data waste, and inefficient systems, devices, and techniques.

Various embodiments described herein include a translator to embed data objects into a multidimensional frame to facilitate classification of and/or correlation between data objects. In some embodiments, embedding data objects, such as JavaScript Object Notation (JSON) objects, may reduce sparsity when converting to a column-wise format and/or reduce storage required for repeated keys, such as ones appearing in many rows. Many embodiments include an encoder that generates a latent space representation of a data object based on the multidimensional frame. Several embodiments include a classifier that is able to classify and/or correlate a data object with other data objects using the latent space representation of the data object. One or more of these components and/or techniques may be used as part of a process to automatically classify, correlate, and/or profile data objects to increase usability of data objects, resulting in more efficient and increased data utilization.

One or more techniques described herein may facilitate accurate characterization of data across disparate portions of an enterprise, leading to useful and previously unknown relationships between data object being identified. In some embodiments, techniques disclosed herein may enable accurate and useful monitoring of data drift. In these and other ways, components/techniques described here may identify methods to increase efficiency, decrease performance costs, decrease computational cost, and/or reduce resource requirements to correlate data objects in an accurate, reactive, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve the technical fields of data management, classification, and/or utilization.

In several embodiments, components described herein may provide specific and particular manners of to enable identification of relationships between data objects to optimize utilization of the data objects. In several such embodiments, the specific and particular manners of enabling identification of relationships between data objects may include one or more of embedding data objects in multidimensional frames, training and/or using an encoder to generate latent space representations of data objects based on the multidimensional frames and using the latent space representations to classify the data objects. In many embodiments, one or more of the components described herein may be implemented as a set of rules that improve computer-related technology by allowing a function not previously performable by a computer that enables an improved technological result to be achieved. For example, the function allowed may include one or more aspects of generating multidimensional frames based on data objects, generating latent space representations of the data objects with the multidimensional frames, and classifying the data objects based on the latent space representations.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 according to one or more embodiments described herein. Operating environment 100 may include a set of one or more data objects 102, a translator 104, a multidimensional frame 106, a trained encoder 108, a latent space representation 110, a classifier 112, and output 114. In many embodiments described herein, the translator 104 may generate the multidimensional frame 106 based on the set of one or more data objects 102, the trained encoder 108 may generate the latent space representation 110 based on the multidimensional frame 106, and the classifier 112 may generate output 114 based on the latent space representation 110. In several embodiments, translating the set of one or more data objects 102 into multidimensional frame 106 and generating the latent space representation 110 based on the multidimensional frame 106 can enable classifier 112 to efficiently and effectively correlate the set of one or more data objects 102 with other sets of one or more data objects. Embodiments are not limited in this context.

In various embodiments, the set of one or more data objects 102, which may include of one or more data objects described herein, may correspond to or be represented as data in tabular format. In various such embodiments, data in tabular format may refer to information arranged in a set of rows and columns. Thus, in several embodiments, the set of one or more data objects 102 may include, correspond to, and/or be generated from a data table. In many embodiments, the set of one or more data objects 102 may include, correspond to, or be generated from a structured or semistructured data set. For example, the set of one or more data objects 102 may include or be created from one or more key-value stores, one or more JSON objects, one or more sets of comma-separated values, or the like. In some embodiments, the translator 104 may be responsible for converting the set of one or more data objects 102 into multidimensional frame 106. For example, the translator 104 may convert the set of one or more data objects 102 into a 3D frame. In such examples, row values may map onto a first dimension, column values may map onto a second dimension, and cell contents may map onto a third dimension. These aspects of the disclosure will be described in more detail below, such as with respect to FIGS. 2A-2D.

In many embodiments, the multidimensional frame 106 may be utilized by a trained encoder 108 to generate a latent space representation 110 of the set of one or more data objects 102. For instance, the trained encoder 108 may be trained with a machine learning model to generate latent space representations of 3D frames such that a respective latent space representation generated with the trained encoder 108 based on a respective 3D frame enables creation of an approximation of the respective 3D frame with a decoder. In some embodiments, the trained encoder 108 may be included in or generated by a machine learning model comprising an autoencoder, such as a variational autoencoder. In various embodiments, the trained encoder 108 may be trained on a plurality of multidimensional frames generated by translator 104 based on a plurality of data objects that are similarly formatted to set of one or more data objects 102. These aspects of the disclosure will be described in more detail below, such as with respect to FIG. 3.

In one or more embodiments, the latent space representation 110 of the set of one or more data objects 102 may include a vector or one-dimensional array of values. In one or more such embodiments, each value in the one-dimensional array of values may correspond to a dimension in the multidimensional frame 106. In several embodiments, the latent space representation 110 may be provided as input to a classifier 112. In several such embodiments, the classifier 112 may generate output 114 that characterizes the latent space representation 110, such as by correlating the latent space representation 110 with one or more other latent space representations. In one or more embodiments described herein, the latent space representation 110 of the set of one or more data objects 102 may enable classifier 112 to characterize the set of one or more data objects 102 based only on the latent space representation 110. In some embodiments, the classifier 112 may be included in or generated by a machine learning model. For example, the classifier 112 may be trained with a machine learning model to classify data objects based on their latent space representations. These aspects of the disclosure will be described in more detail below, such as with respect to FIG. 4.

In some embodiments, one or more techniques described herein may be used to facilitate classification of data objects that indicate status of system components and/or resources. In some such embodiments, the statuses may indicate whether various objects, instances, components, resources, and the like are running, stopped, failed, etcetera. For example, JSON objects may indicate status of various components and/or resources in a system, such as one deployed and/or implemented by one or more networked or cloud resources. In various embodiments, the data objects may be received in response to a query and/or comprise portions of a log. In many embodiments, embedding the data objects in multidimensional frames may facilitate classification of the data objects in a manner that enables efficient monitoring and/or analysis of system operation and/or issues.

FIGS. 2A-2D illustrate various aspects of embedding a set of one or more data objects 202 into a 3D frame 206 in environments 200A, 200B, 200C, 200D according to one or more embodiments described herein. In various embodiments, one or more components of environments 200A, 200B, 200C, 200D may be the same or similar to one or more components of environment 100. For instance, the set of one or more data objects 202 may be the same or similar to the set of one or more data objects 102. Environment 200A may illustrate the translation of the set of one or more data objects 202 into 3D frame 206 at a conceptual level. The illustrated embodiment of environment 200A may include data objects 202-1, 202-2, **202-*n* in the set of one or more data objects 202, translator 104, and 3D frame 206. In environment 200A, for simplicity, only data object 202-1 is illustrated with a set of object entries 220-1, 220-2, 220-*n* (or object entries 220). However, each of the data objects 202-1, 202-2, 202-*n* (or data objects 202) may include a set of one or more object entries. Environment 200B may illustrate mapping of data objects 202 onto a row dimension 228 of 3D frame 206. Environment 200C may illustrate mapping of object entries 220 onto a column dimension 230 of 3D frame 206. Environment 200D may illustrate the translation of object entry 220-2 of data object 202-1 as an exemplary step in generating 3D frame 206 (i.e., 3D frame 256). The illustrated embodiment of environment 200D may include 3D frame 256 and data object 202-1 with object entry 220-1**. Embodiments are not limited in this context.

Figure 2A:
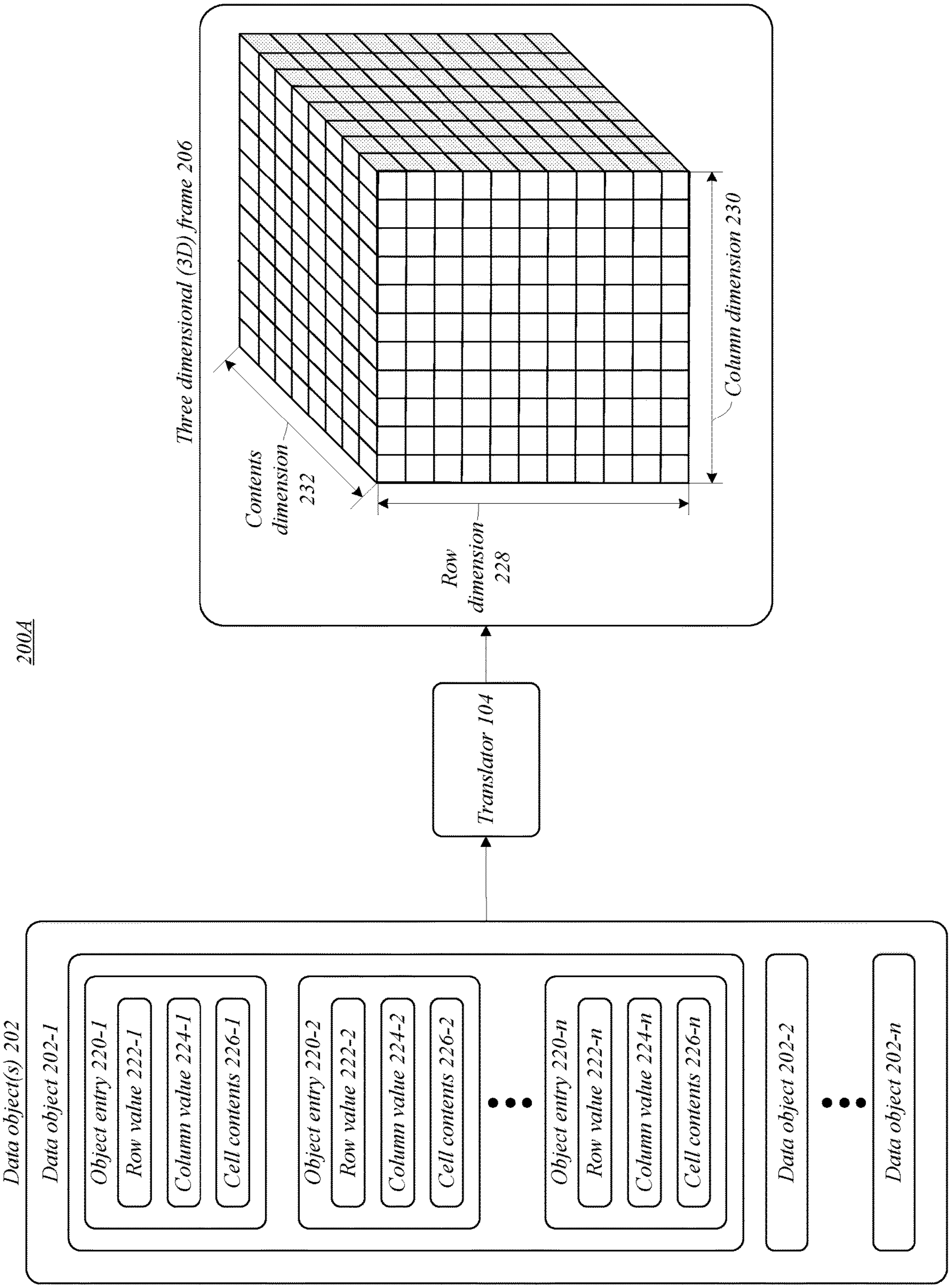
FIGS. 2A-2D illustrate various aspects of embedding a set of one or more data objects into a three-dimensional (3D) frame according to one or more embodiments described herein.

Referring to FIG. 2A, environment 200A shows a conceptual translation of the set of one or more data objects 202 into 3D frame 206 by translator 104. In several embodiments, data objects 202-1, 202-2, **202-*n* may be representative of one or more data objects described herein. In various embodiments, each of the data objects 202 may include one or more object entries 220. As previously mentioned, one or more data objects, or sets of data objects, described herein may correspond to or be represented as data in tabular format, such as in a data table. Therefore, in several embodiments, each of the one or more object entries 220 in the data object 202** may correspond to a unique column/row intersection in a data table as well as the contents of the unique column/row intersection.

For example, each data object may correspond to a different row value and each object entry of a data object may correspond to a different column value. In such examples, each object entry 220 may correspond to a different key in a different key-value pair with the cell contents of each object entry 220 comprising the value of the corresponding key-value pair. In many embodiments, one row may correspond to one data object, each column may correspond to a different key, and tokenized encoded values may map along the contents dimension 232.

Accordingly, object entry 220-1 may include row value 222-1, column value 224-1, and cell contents 226-1, object entry 220-2 may include row value 222-2, column value 224-2, and cell contents 226-2, and object entry **220-*n* may include row value 222-*n*, column value 224-*n*, and cell contents 226-*n*. In various embodiments, one or more of the cell contents 226-1, 226-2, 226-*n* (or cell contents 226) may comprise a value, such as a string, a vector, or a set of vectors. In some embodiments, one or more of the cell contents 226 may map to another data object or object entry. In some such embodiments, the one or more of the cell contents may map to another cell contents in the other data object or object entry. For instance, cell contents 226-1 may map to cell contents 226-*n* or cell contents 226-1 may map to object entry 220-2**.

In some embodiments, the number of object entries 220 in data object 202 may correspond to the number of unique column/row intersections in the corresponding data table. For instance, a data table with 10 rows and 10 columns may include 100 object entries. However, in other embodiments, the number of object entries 220 in data object 202 may correspond to the number of unique column/row intersections that do not include null contents. For example, a data table with 10 rows and 10 columns, but with non-null contents in 15 of the 100 column/row intersections would include 15 object entries. In such embodiments, column/row intersections without a corresponding object entry will be identified as having null contents. Further, in such embodiments, data object 202 may include metadata indicative of an appropriate number of columns and rows. Additionally, any embodiment may include data object metadata.

In several embodiments, translator 104 may generate 3D frame 206 based on data object 202. In many embodiments, generation of 3D frame 206 may include mapping each of object entries of each data object 220-1, 220-2, **220-*n* into the 3D frame 206. For example, with respect to object entry 220-2, cell contents 226-2 may be mapped along the contents dimension 232 at the intersection of the column value 224-2 and the row value 222-2. In such examples, the column value 224-2 may correspond to the object entry 220-2 and the row value 222-2 may correspond to the data object 202-1. Mapping of data objects 202 and object entries 220 onto the 3D frame 206 is illustrated and described in more detail below with respect to FIGS. 2B-2D**.

In some embodiments, data object 202 may include metadata that indicate one or more characteristics of the 3D frame generated by translator 104. In many embodiments, translator 104 may utilize one or more customizable settings that indicate one or more characteristics of the 3D frame generated by translator 104. As shown in environment 200A, 3D frame 206 may include a row dimension 228, a column dimension 230, and a contents dimension 232. In many embodiments, padding may be added to one or more dimensions of 3D frame 206. In many such embodiments, the padding may be added based on data object metadata and/or the one or more customizable settings of translator 104. As will be appreciated, 3D frame 206 is described with respect to FIG. 2A, however, any multidimensional frame may be utilized without departing from the scope of this disclosure. For instance, one or more additional dimensions may correspond to vector representations of each character in a string of characters that comprise a value in a key-value pair. In another instance, one or more additional dimensions may correspond to data object metadata.

Figure 2B:
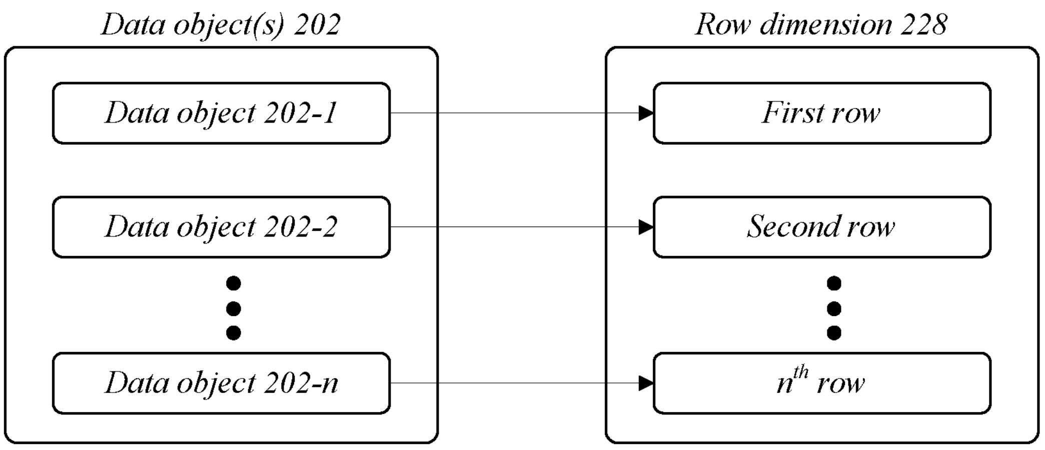

Referring to FIG. 2B, as previously mentioned, environment 200B may illustrate mapping of data objects 202 onto the row dimension 228 of 3D frame 206. In FIG. 2B, environment 200B may include the set of one or more data objects 202 and row dimension 228 with a first row, a second row, and a $n^{th}$ row. In many embodiments, data object 202-1 may correspond to the first row of the row dimension 228, data object 202-2 may correspond to the second row of the row dimension 228, and data object **202-*n* may correspond to the $n^{th}$ row of the row dimension 228. Accordingly, each object entry in data object 202-1 may map to an intersection of the first row with a different column value of the column dimension 230 with the cell contents of each object entry mapping along the contents dimension 232** at the corresponding intersection.

Figure 2C:
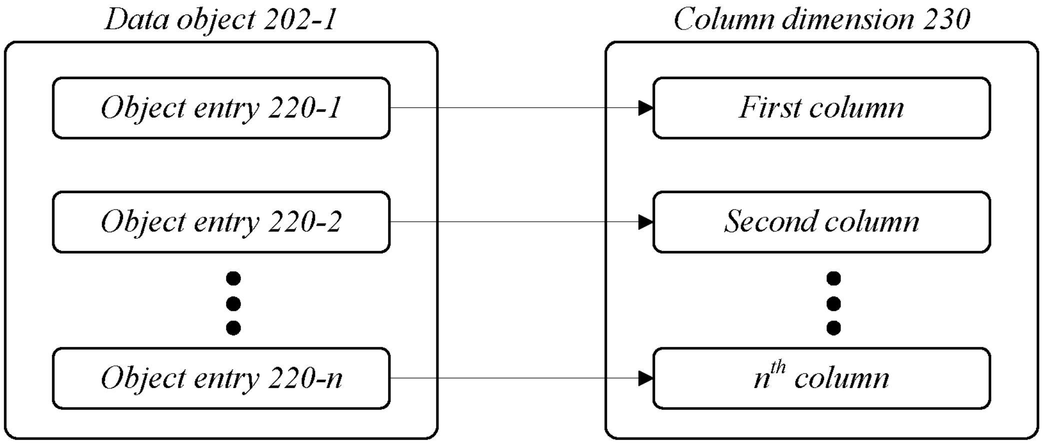

Referring to FIG. 2C, as previously mentioned, environment 200C may illustrate mapping of object entries 220 onto the column dimension 230 of 3D frame 206. In FIG. 2C, environment 200C may include data object 202-1 with object entries 220 and column dimension 230 with a first column, a second column, and a $n^{th}$ column. In many embodiments, object entry 220-1 may correspond to the first column of the column dimension 230, object entry 220-2 may correspond to the second column of the column dimension 230, and object entry **220-*n* may correspond to the $n^{th}$ column of the column dimension 230. Similarly, data object 202-2 and data object 202-*n* may include similar object entries corresponding to the first, second, and $n^{th}$ columns of the column dimension 230. Thus, each object entry in each data object in the set of data objects 202 may correspond to a column value on the column dimension 230. In several embodiments, each object entry in a data object may correspond to a unique key in a key-value pair. In several such embodiments, each data object may include object entries for one or more keys in a set of keys. However, if a data object does not include an object entry corresponding to a key in the set of keys, nothing may be mapped along the contents dimension 232 at the corresponding intersection of the row dimension 228 and the column dimension 230. Object entries in different data objects may correspond to a common key and therefore a common column value, but object entries in a common data object may not correspond to the same key. Further, since each data object corresponds to a unique row value, the cell contents of each object entry (e.g., the value of the key-value pair) may be mapped along the contents dimension 232 at a unique intersection of the row dimension 228 and the column dimension 230**.

Figure 2D:
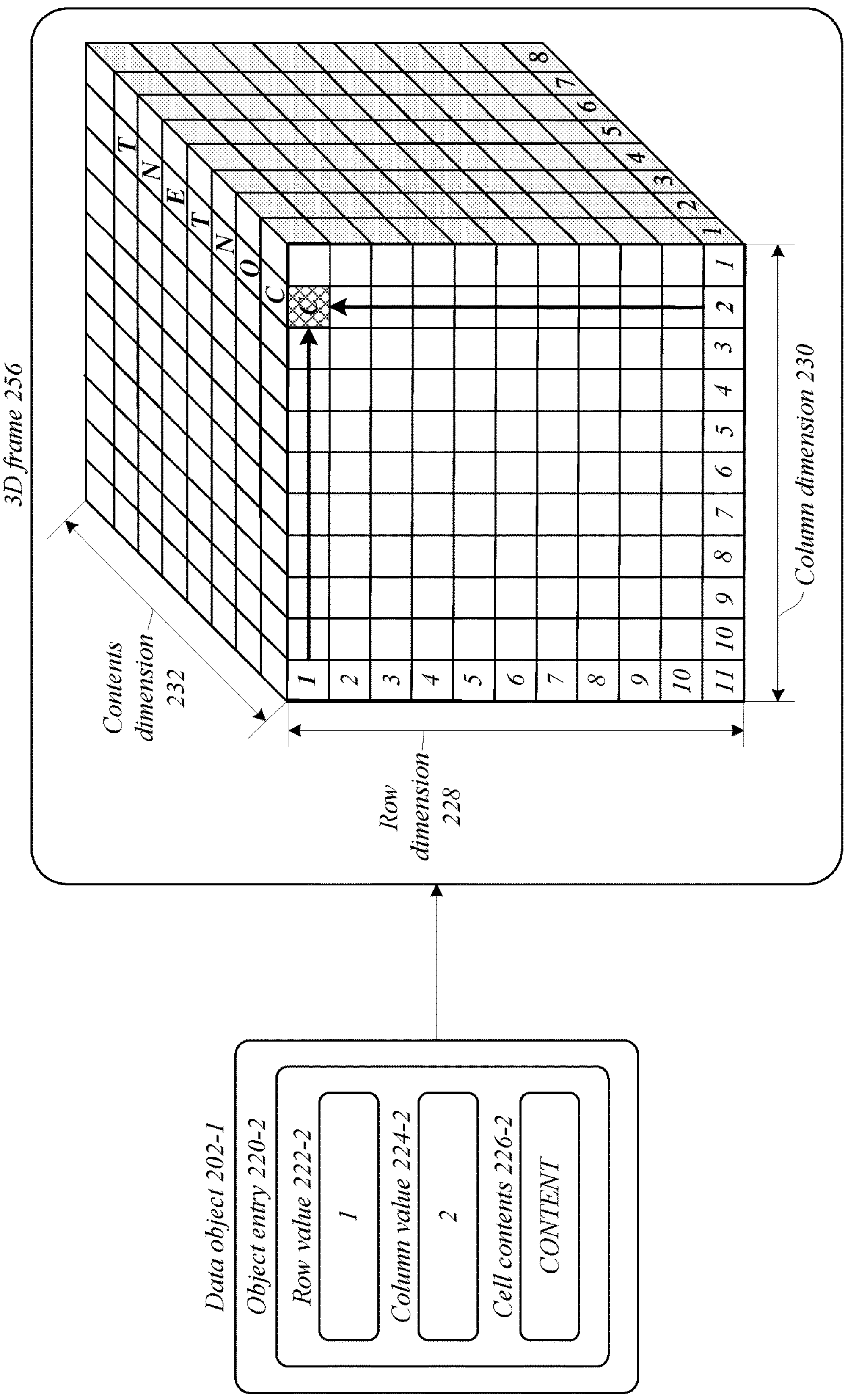

Referring to FIG. 2D, as previously mentioned, environment 200D may illustrate the translation of object entry 220-2 of data object 202-1 as an exemplary step in generating 3D frame 206 (i.e., 3D frame 256). In FIG. 2D, environment 200D includes data object 202-1 with an exemplary embodiment of object entry 220-2 and 3D frame 256. Generally, 3D frame 256 may show an exemplary stage in the translation of data object 202 into 3D frame 206. More specifically, 3D frame 256 may show mapping of the exemplary embodiment of object entry 220-2 onto the 3D frame 206. In the exemplary embodiment of object entry 220-2, the row value 222-2 may be 1 corresponding to the first data object 202-1, the column value 224-2 may be 2 corresponding to the second object entry 220-2, and the cell contents 226-2 may be CONTENT. Thus, the row value 222-2 of 1 is mapped onto the row dimension 228 of 3D frame 256, the column value 224-2 of 2 is mapped onto the column dimension 230 of 3D frame 256, and the cell contents 226-2 of CONTENT is mapped along the contents dimension 232 of 3D frame 256. In other words, CONTENT may be mapped along the contents dimension 232 at the intersection of column 2 and row 1.

Therefore, as shown in FIG. 2D, "C" is located at value 1 along the contents dimension 232, "O" is located at value 2 along the contents dimension 232, "N" is located at value 3 along the contents dimension 232, "T" is located at value 4 along the contents dimension 232, "E" is located at value 5 along the contents dimension 232, "N" is located at value 6 along the contents dimension 232, and "T" is located at value 2 along the contents dimension 232. In some embodiments, the empty space at value 8 along the contents dimension 232 at the intersection of column 2 and row 1 may be padding. In many embodiments, this mapping process may be repeated for each object entry in data object 202 to generate 3D frame 206. For example, cell contents 226-1 of object entry 220-1 in data object 202-1 may be mapped along the contents dimension 232 at the intersection of column 1 and row 1. In another example, cell contents of a first object entry in data object 202-2 may be mapped along the contents dimension 232 at the intersection of column 2 and row 1. In such other examples, the first object entry in data object 202-2 would share a common key value with object entry 220-1.

As previously mentioned, in some embodiments one or more additional dimensions may correspond to vector representations of each character in a string of characters that comprise cell contents, such as a value in a key-value pair. Accordingly, with respect to FIG. 2D, each character in CONTENTS may be encoded into one or more the vector representations that are mapped along additional dimensions. For example, each character may be encoded into a vector representation using one-hot encoding and then mapped along an additional dimension. In many embodiments, tokenized encoded values may map along the contents dimension 232. For instance, character, word, sentence, etcetera level encoding (which in and of itself can be an n-dimensional vector which represents the character, word, sentence, etcetera) may be mapped along the contents dimension 232.

Figure 3:
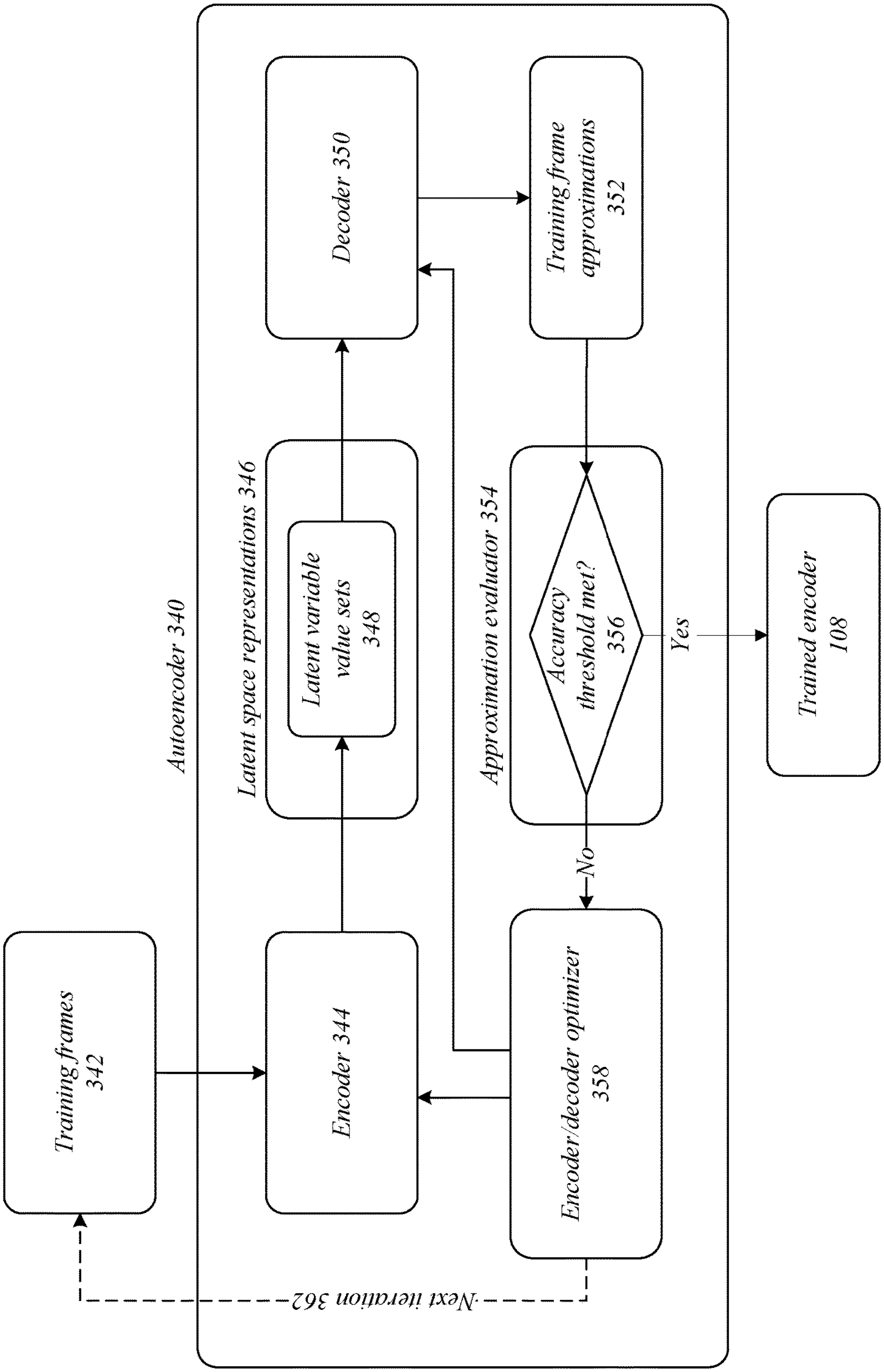
FIG. 3 illustrates an exemplary process flow for generating a trained encoder based on a set of training frames according to one or more embodiments described herein.

FIG. 3 illustrates an exemplary process flow 300 for generating trained encoder 108 based on a set of training frames 342 in environment 300 according to one or more embodiments described herein. In various embodiments, one or more components of environment 300 may be the same or similar to one or more components of environment 100. The illustrated embodiment of environment 300 may include a set of training frames 342, autoencoder 340, and trained encoder 108. In one or more embodiments described herein, autoencoder 340 may generate trained encoder 108 based on the set of training frames 342. In one or more such embodiments, the autoencoder 340 may utilize a machine learning model to generate trained encoder 108 based on the set of training frames 342. Embodiments are not limited in this context.

In several embodiments, the set of training frames 342 may include a plurality of different multidimensional frames 106 (e.g., a plurality of different 3D frames). In many embodiments, the set of training frames 342 may be similar to multidimensional frame 106 or 3D frame 206. In some embodiments, the set of training frames 342 may share a common format. In some such embodiments, the set of training frames 342 may share a common format with 3D frame 206 and/or multidimensional frame 106.

In various embodiments, the set of training frames 342 may be provided to the autoencoder 340 as input. In many embodiments, the autoencoder 340 may utilize machine learning to analyze and identify patterns in the set of training frames 342. In many such embodiments, the identified patterns in the set of training frames 342 may be utilized to enable trained encoder 108 to generate latent space representations of multidimensional frames provided as input. In some embodiments, the latent space representations may characterize multidimensional frames provided as input in a manner that enables them to be provided as input to a classifier, such as a machine learning classifier.

In many embodiments, the autoencoder 340 may include an encoder 344, a set of one or more latent space representations 346 with a set of one or more latent variable value sets 348, a decoder 350, a set of one or more training frame approximations 352, an approximation evaluator 354, and an encoder/decoder optimizer 358. In various embodiments, the encoder 344 may generate a latent space representation comprising a latent variable value set for each training frame in the set of training frames 342. As previously mentioned, latent space representations may include a one-dimensional array of values. Accordingly, each of the latent variable value sets 348 may comprise a one-dimensional array of values. In many embodiments, each value in the one-dimensional array of values may correspond to a dimension in the training frames. For example, the latent space representation of a 3D frame may comprise a one-dimensional array of three values. In some embodiments, the array of values may be referred to as a vector.

In several embodiments, the decoder 350 may generate the set of one or more training frame approximations 352 based on the set of one or more latent space representations 346. In several such embodiments, the decoder 250 may generate a training frame approximation for each latent space representation in the set of latent space representations 346. In various embodiments, the approximation evaluator 354 may compare the set of training frame approximations 352 to the set of training frames 342 and determine an accuracy of the set of training frame approximations 352. In various such embodiments, the accuracy of the set of training frame approximations 352 may be based on a similarity between the set of training frame approximations 352 and the set of training frames 342. In some embodiments, each training frame approximation in the set of training frame approximations 352 may correspond to a training frame in the set of training frames 342. In some such embodiments, a similarity between each corresponding training frame/training frame approximation may be utilized to determine the similarity between the set of training frame approximations 352 and the set of training frames 342. If the approximation evaluator 354 determines an accuracy threshold is met at block 356, the encoder 344 may be provided as trained encoder 108.

However, in practice, the accuracy threshold will not be met until a plurality of iterations have been performed. Thus, when the accuracy threshold is not met at block 356, the encoder/decoder optimizer 358 may modify the encoder 344 and the decoder 350 in an effort to improve the similarity between a subsequent set of training frame approximations. In several embodiments, the encoder/decoder optimizer 358 may utilize a machine learning model to modify the encoder 344 and decoder 350. A next iteration 362 may be performed on the set of training frames 342 once the modifications to the encoder 344 and decoder 350 have been made and this process may be repeated until the accuracy threshold is met at block 356 is met and the encoder 344 is provided as trained encoder 108. In several embodiments, the trained encoder 108 may comprise a neural network.

Figure 4:
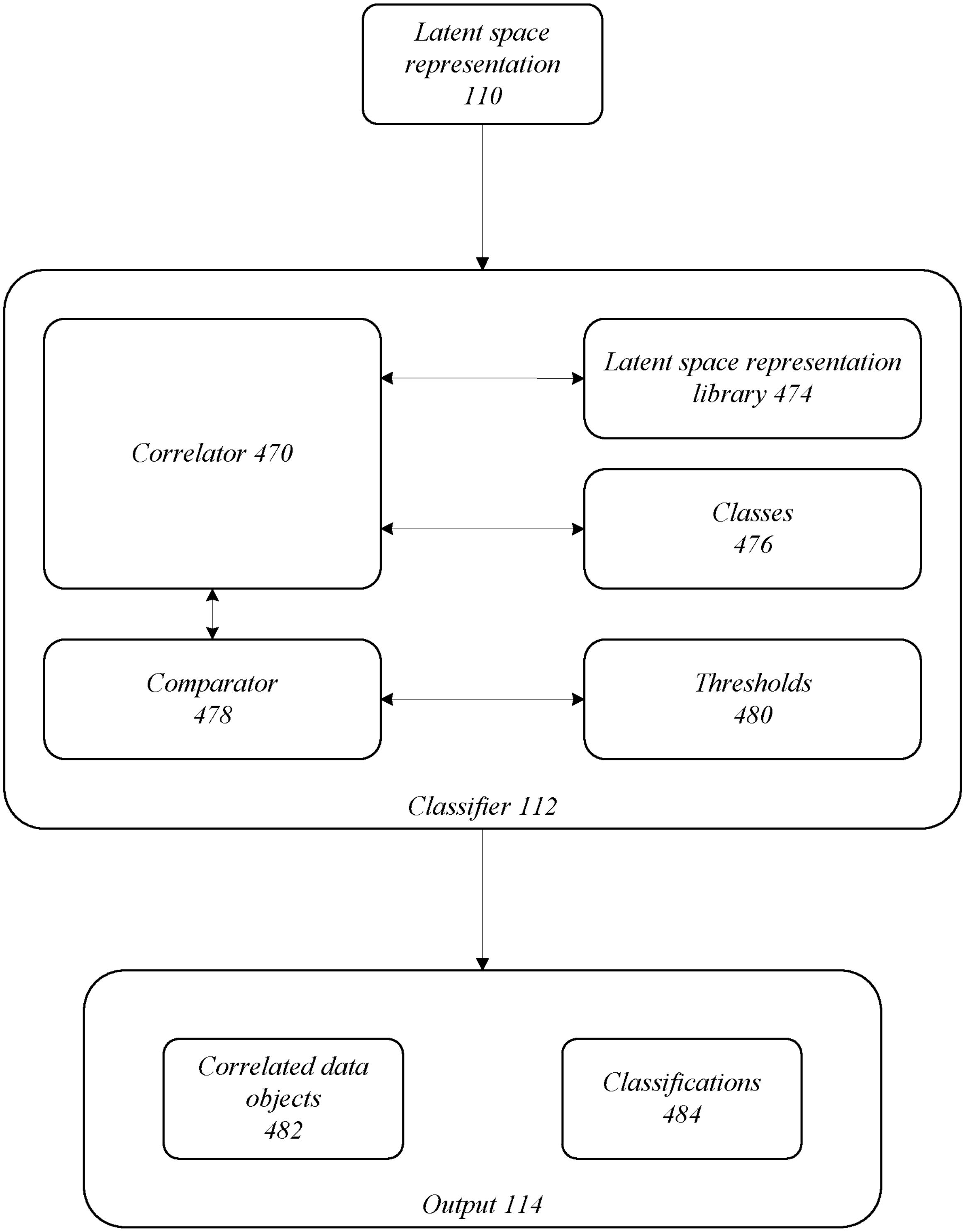
FIG. 4 illustrates various aspects of classifying a latent space representation generated based on a data object according to one or more embodiments described herein.

FIG. 4 illustrates various aspects of classifying latent space representation 110 generated based on data object 108 in environment 400 according to one or more embodiments described herein. In various embodiments, one or more components of environment 300 may be the same or similar to one or more components of environment 100. Environment 400 may include latent space representation 110, classifier 112, and output 114. In the illustrated embodiments, the classifier may include a correlator 470, a latent space representation library 474, one or more classes 476, a comparator 478, and one or more thresholds 480; the output 114 may include correlated data objects 482 and classification 484. In one or more embodiments described herein, the classifier 112 may generate output 114 that characterizes the latent space representation 110, such as by correlating the latent space representation 110 with one or more other latent space representations in latent space representation library 474. Embodiments are not limited in this context.

In several embodiments, the latent space representation 110 may be provided as input to a classifier 112. In many embodiments, classifier 112 may compute a set of correlation scores based on the latent space representation 110, such as via correlator 470. In many such embodiments, the classifier 112 may utilize a machine learning model to compute the set of correlation scores. For instance, correlator 470 may utilize a neural network to compute the set of correlation scores. In some embodiments, the classifier 112 may be trained on a set of training latent space representations. In some such embodiments, the set of training latent space representations may be generated by trained encoder 108, such as based on the set of training frames 342. In various embodiments, one or more correlation scores in the set of correlation scores may correlate the latent space representation 110 to a corresponding one or more latent space representations in the latent space representation library 474.

More generally, in various embodiments, classifier 112 and/or correlator 470 may utilize an iterative learning procedure to finally find the best correlated latent space representation, such as from latent space representation library 474. In several embodiments, classifier 112 and/or correlator 470 may be based on specific tasks, such as classification or regression. In many embodiments, these specific tasks may be based on specific data set properties, such as system logs, email logs, firewall logs, or the like. In some embodiments, classifier 112 and/or correlator 470 may utilize a statistical approach in combination with, or in place of, machine learning techniques. For example, a covariance matrix may be used to compare latent space representations. In another example, a distance-based approach may be used, such as with cosine-similarity or Jaccard similarity coefficient, to measure an inter-distance between data objects in the latent space representations.

In some embodiments, one or more of the latent space representations in the latent space representation library 474 may correspond to one or more training frames in the set of training frames 342. In several embodiments, one or more of the latent space representations in the latent space representation library 474 may correspond to one or more data objects created as part of enterprise operations, such as business operations. In some embodiments, one or more correlation scores in the set of correlation scores may correlate the latent space representation to a corresponding one or more classes in the set of classes 476.

In many embodiments, classifier 112 may utilize the set of correlation scores to generate output 114 regarding the latent space representation 110. In several embodiments, classifier 112 may identify one or more correlated data objects 482 and/or one or more classifications 484 based on the correlation scores, such as via comparator 478, to provide in output 114. For instance, comparator 478 may compare correlation scores in the set of correlation scores to one or more thresholds 480 to identify the one or more correlated data objects 482 and/or the one or more classifications 484. In some embodiments, classifier 112 may generate a profile for the latent space representation 110 based on the set of correlation scores. In some such embodiments, the profile for the latent space representation 110 may be included in output 114.

FIG. 5A illustrates one embodiment of a logic flow 500A, which may be representative of operations that may be executed in various embodiments in conjunction with techniques for embedding data objects in multidimensional frames and/or classifying the multidimensional frames. The logic flow 500A may be representative of some or all of the operations that may be executed by one or more components/devices/environments described herein, such as translator 104, trained encoder 108, classifier 112, and autoencoder 340. The embodiments are not limited in this context.

In the illustrated embodiments, logic flow 500A may begin at block 502. At block 502 "identify a data object comprising a set of object entries, wherein each object entry in the set of object entries include data indicative of a row value, a column value, and cell contents" a data object comprising a set of object entries may be identified and each object entry in the set of object entries may include a row value, a column value, and cell contents. In various embodiments, translator 104 may identify the data object comprising the set of object entries. For instance, translator 104 may identify data object 202-1 comprising one or more object entries 220-1, 220-2, **220-*n***.

Continuing to block 504 "generate a multidimensional frame based on the data object, the multidimensional frame comprising a row dimension, a column dimension, and a contents dimension, wherein at least one row value is mapped onto the row dimension, at least one column value is mapped onto the column dimension, and at least one cell contents is mapped along the contents dimension to generate the multidimensional frame" a multidimensional frame comprising a row dimension, a column dimension, and a contents dimension may be generated based on the data object and at least one row value may be mapped onto the row dimension, at least one column value may be mapped onto the column dimension, and at least one cell contents may be mapped along the contents dimension to generate the multidimensional frame. In some embodiments, translator 104 may generate the multidimensional frame. For instance, translator 104 may map row value 222-2 of object entry 220-2 onto row dimension 228, column value 224-2 of object entry 220-2 onto column dimension 230 and cell contents 226-2 of object entry 220-2 along contents dimension 232 to generate 3D frame 206.

Proceeding to block 506 "utilize a trained encoder to embed the multidimensional frame into a latent space representation of the multidimensional frame, wherein the trained encoder is trained with a machine learning model to generate latent space representations of multidimensional frames, and a respective latent space representation generated with the trained encoder based on a respective multidimensional frame enables creation of an approximation of the respective multidimensional frame with a decoder" a trained encoder may be utilized to embed the multidimensional frame into a latent space representation of the multidimensional frame and the trained encoder may be trained with a machine learning model to generate latent space representations of multidimensional frames, wherein a respective latent space representation generated with the trained encoder based on a respective multidimensional frame enables creation of an approximation of the respective multidimensional frame with a decoder. In some embodiments, trained encoder 108 may be utilized to embed the multidimensional frame 106 into latent space representation 110. In many embodiments, trained encoder 108 may be generated with autoencoder 346.

At block 508 "compute a set of correlation scores based on the latent space representation of the multidimensional frame, wherein each correlation score in the set of correlation scores corresponds to a different latent space representation of a different multidimensional frame generated based on a different data object" a set of correlations scores may be computed based on the latent space representation of the multidimensional frame and each correlation score in the set of correlation scores may correspond to a different latent space representation of a different multidimensional frame generated based on a different data object. In some embodiments, classifier 112 may compute the set of correlations scores based on latent space representation 110.

Continuing to block 510 "compare the set of correlation scores to a correlation threshold to identify a set of correlated latent space representations" the set of correlation scores may be comparted to a correlation threshold to identify a set of correlated latent space representations. For example, comparator 478 may compare the set of correlations scores to a threshold in thresholds 480. At block 512 "identify a set of correlated data objects based on the set of correlated latent space representations" a set of correlated data objects may be identified based on the set of correlated latent space representations. For example, correlated data objects 482 may be identified based on the set of correlated latent space representations. Proceeding to block 514 "provide the set of correlated data objects as output" the set of correlated data objects may be provided as output. For instance, classifier 112 may provide the set of correlated data objects 482 as output 114.

FIG. 5B illustrates one embodiment of a logic flow 500B, which may be representative of operations that may be executed in various embodiments in conjunction with techniques for embedding data objects in multidimensional frames and/or classifying the multidimensional frames. The logic flow 500B may be representative of some or all of the operations that may be executed by one or more components/devices/environments described herein, such as translator 104, trained encoder 108, classifier 112, and autoencoder 340. The embodiments are not limited in this context.

In the illustrated embodiments, logic flow 500B may begin at block 530. At block 530 "identify a data object comprising a set of object entries, wherein each object entry in the set of object entries include data indicative of a row value, a column value, and cell contents" a data object comprising a set of object entries may be identified and each object entry in the set of object entries may include a row value, a column value, and cell contents. In various embodiments, translator 104 may identify the data object comprising the set of object entries. For instance, translator 104 may identify data object 202-1 comprising one or more object entries 220-1, 220-2, **220-*n***.

Continuing to block 532 "produce a multidimensional frame based on the data object, the multidimensional frame comprising a row dimension, a column dimension, and a contents dimension, wherein at least one row value is mapped onto the row dimension, at least one column value is mapped onto the column dimension, and at least one cell contents are mapped along the contents dimension to generate the multidimensional frame" a multidimensional frame comprising a row dimension, a column dimension, and a contents dimension may be generated based on the data object and at least one row value may be mapped onto the row dimension, at least one column value may be mapped onto the column dimension, and at least one cell contents may be mapped along the contents dimension to generate the multidimensional frame. In some embodiments, translator 104 may generate the multidimensional frame. For instance, translator 104 may map row value 222-2 of object entry 220-2 onto row dimension 228, column value 224-2 of object entry 220-2 onto column dimension 230 and cell contents 226-2 of object entry 220-2 along contents dimension 232 to generate 3D frame 206.

Proceeding to block 534 "utilize a trained encoder to embed the multidimensional frame into a latent space representation of the multidimensional frame, wherein the trained encoder is trained with a machine learning model to generate latent space representations of multidimensional frames, and a respective latent space representation generated with the trained encoder based on a respective multidimensional frame enables creation of an approximation of the respective multidimensional frame with a decoder" a trained encoder may be utilized to embed the multidimensional frame into a latent space representation of the multidimensional frame and the trained encoder may be trained with a machine learning model to generate latent space representations of multidimensional frames, wherein a respective latent space representation generated with the trained encoder based on a respective multidimensional frame enables creation of an approximation of the respective multidimensional frame with a decoder. In some embodiments, trained encoder 108 may be utilized to embed the multidimensional frame 106 into latent space representation 110. In many embodiments, trained encoder 108 may be generated with autoencoder 346.

At block 536 "generate a set of correlation scores based on the latent space representation of the multidimensional frame, wherein each correlation score in the set of correlation scores corresponds to a different latent space representation of a different multidimensional frame generated based on a different data object" a set of correlations scores may be computed based on the latent space representation of the multidimensional frame and each correlation score in the set of correlation scores may correspond to a different latent space representation of a different multidimensional frame generated based on a different data object. In some embodiments, classifier 112 may compute the set of correlations scores based on latent space representation 110.

Continuing to block 538 "compare the set of correlation scores to determine a classification of the latent space representation of the multidimensional frame" the set of correlation scores may be compared to determine a classification of the latent space representation of the multidimensional frame. For example, comparator 478 may compare the set of correlation scores to classes 476 and/or thresholds 480 to determine the classification 484.

Figure 5C:
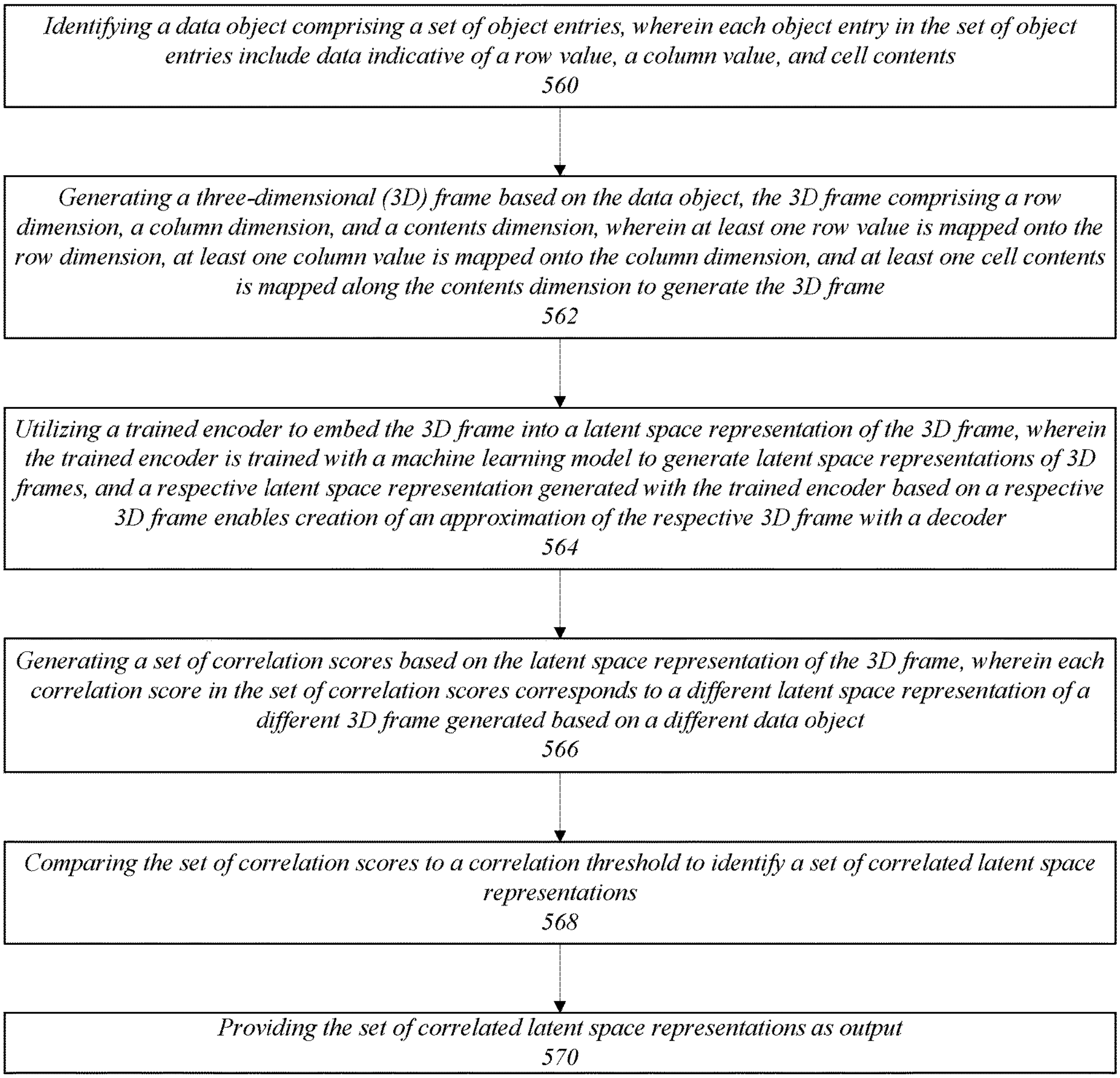

FIG. 5C illustrates one embodiment of a logic flow 500C, which may be representative of operations that may be executed in various embodiments in conjunction with techniques for embedding data objects in multidimensional frames and/or classifying the multidimensional frames. The logic flow 500C may be representative of some or all of the operations that may be executed by one or more components/devices/environments described herein, such as translator 104, trained encoder 108, classifier 112, and autoencoder 340. The embodiments are not limited in this context.

In the illustrated embodiments, logic flow 500C may begin at block 560. At block 560 "identifying a data object comprising a set of object entries, wherein each object entry in the set of object entries include data indicative of a row value, a column value, and cell contents" a data object comprising a set of object entries may be identified and each object entry in the set of object entries may include a row value, a column value, and cell contents. In various embodiments, translator 104 may identify the data object comprising the set of object entries. For instance, translator 104 may identify data object 202-1 comprising one or more object entries 220-1, 220-2, **220-*n***.

Continuing to block 562 "generating a 3D frame based on the data object, the 3D frame comprising a row dimension, a column dimension, and a contents dimension, wherein at least one row value is mapped onto the row dimension, at least one column value is mapped onto the column dimension, and at least one cell contents is mapped along the contents dimension to generate the 3D frame" a 3D frame comprising a row dimension, a column dimension, and a contents dimension may be generated based on the data object and at least one row value may be mapped onto the row dimension, at least one column value may be mapped onto the column dimension, and at least one cell contents may be mapped along the contents dimension to generate the 3D frame. In some embodiments, translator 104 may generate the 3D frame. For instance, translator 104 may map row value 222-2 of object entry 220-2 onto row dimension 228, column value 224-2 of object entry 220-2 onto column dimension 230 and cell contents 226-2 of object entry 220-2 along contents dimension 232 to generate 3D frame 206.

Proceeding to block 564 "utilizing a trained encoder to embed the 3D frame into a latent space representation of the 3D frame, wherein the trained encoder is trained with a machine learning model to generate latent space representations of 3D frames, and a respective latent space representation generated with the trained encoder based on a respective 3D frame enables creation of an approximation of the respective 3D frame with a decoder" a trained encoder may be utilized to embed the 3D frame into a latent space representation of the 3D frame and the trained encoder may be trained with a machine learning model to generate latent space representations of 3D frames, wherein a respective latent space representation generated with the trained encoder based on a respective 3D frame enables creation of an approximation of the respective 3D frame with a decoder. In some embodiments, trained encoder 108 may be utilized to embed the 3D frame 106 into latent space representation 110. In many embodiments, trained encoder 108 may be generated with autoencoder 346.

At block 566 "generating a set of correlation scores based on the latent space representation of the 3D frame, wherein each correlation score in the set of correlation scores corresponds to a different latent space representation of a different 3D frame generated based on a different data object" a set of correlations scores may be computed based on the latent space representation of the 3D frame and each correlation score in the set of correlation scores may correspond to a different latent space representation of a different 3D frame generated based on a different data object. In some embodiments, classifier 112 may compute the set of correlations scores based on latent space representation 110.

Continuing to block 568 "comparing the set of correlation scores to a correlation threshold to identify a set of correlated latent space representations" the set of correlation scores may be comparted to a correlation threshold to identify a set of correlated latent space representations. For example, comparator 478 may compare the set of correlations scores to a threshold in thresholds 480. At block 570 "provide the set of correlated latent space representations output" the set of correlated latent space representations may be provided as output. For instance, classifier 112 may provide the set of correlated latent space representations as output 114.

Figure 6:
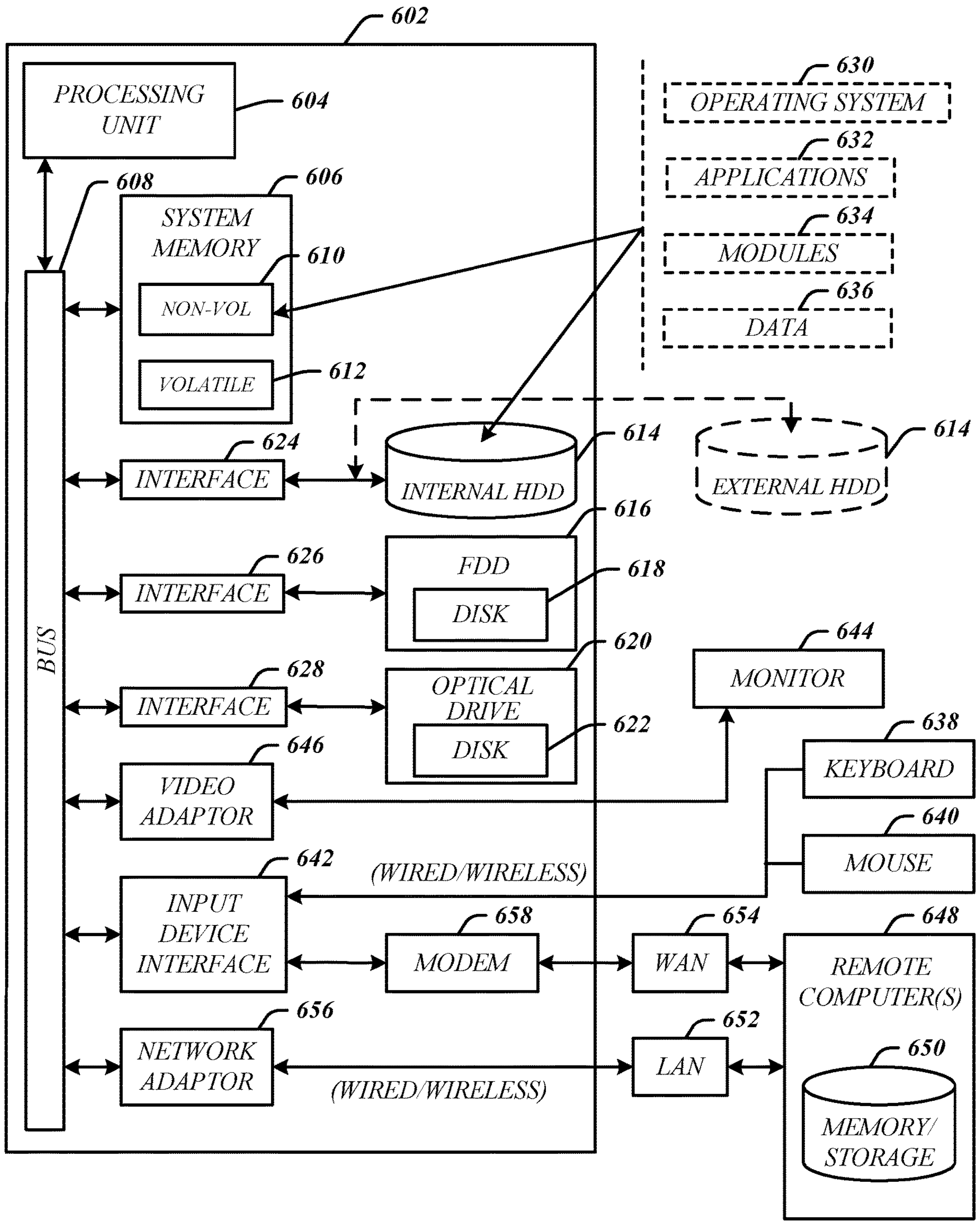
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more portions of components and/or techniques described herein, such as translator 104, trained encoder 108, classifier 112, and/or autoencoder 340. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
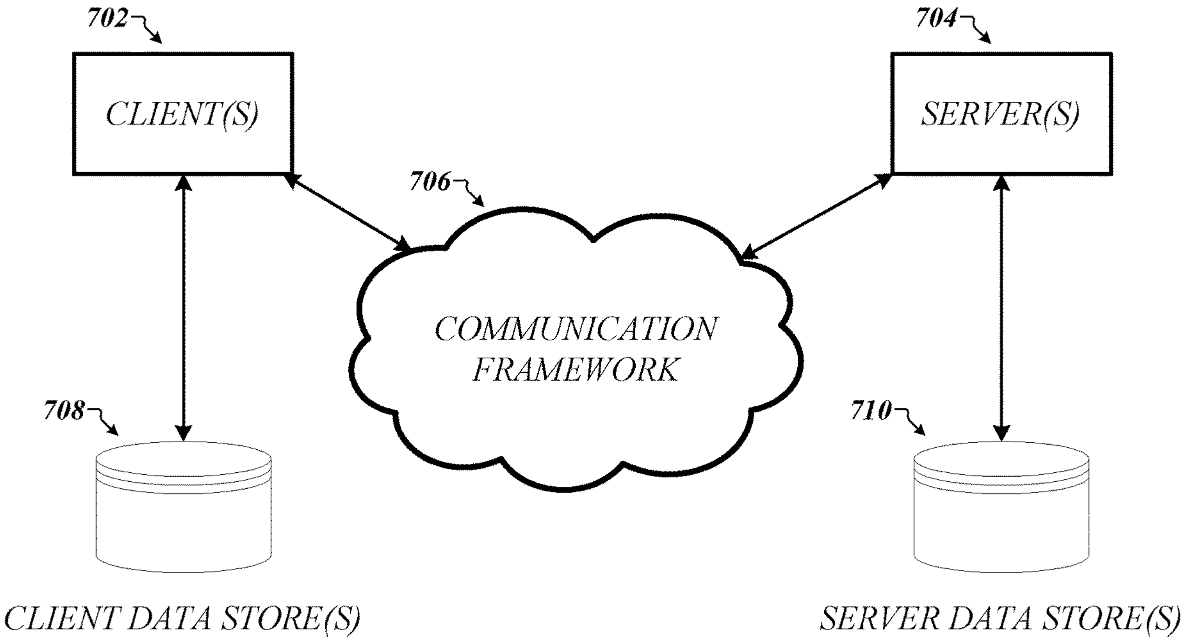
FIG. 7 illustrates exemplary aspects of a communications architecture according to one or more embodiments described herein.

FIG. 7 illustrates a block diagram of an exemplary communications architecture 700 suitable for implementing various embodiments as previously described, such as translator 104, trained encoder 108, classifier 112, and/or autoencoder 340. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, comprising:

a processor; and memory comprising instructions that when executed by the processor cause the processor to:

determine a multidimensional frame based on a data object, the multidimensional frame comprising a row dimension, a column dimension, and a contents dimension;

add padding to one or more dimensions of the multidimensional frame based on metadata included in the data object that indicates one or more characteristics of the multidimensional frame;

utilize a trained encoder to embed the multidimensional frame into a latent space representation, wherein the trained encoder is trained with a machine learning model to generate latent space representations of multidimensional frames;

compute a set of correlation scores for the latent space representation of the multidimensional frame, wherein each correlation score in the set of correlation scores corresponds to a different latent space representation of a different multidimensional frame generated based on a different data object;

compare the set of correlation scores to a correlation threshold to identify a set of correlated latent space representations;

identify a set of correlated data objects to the data object based on the set of correlated latent space representations; and provide the set of correlated data objects as output.

2. The apparatus of claim 1, the memory comprising instruction that when executed by the processor to cause the processor to generate the trained encoder with the machine learning model, wherein the trained encoder comprises a neural network trained on a set of training multidimensional frames.

3. The apparatus of claim 2, wherein the machine learning model comprises an autoencoder.

4. The apparatus of claim 2, wherein the trained encoder to identify patterns in the set of training multidimensional frames, the identified patterns in the set of training multidimensional frames to enable the trained encoder to identify the latent space representations of multidimensional frames.

5. The apparatus of claim 2, wherein the latent space representation comprises a latent variable value set for each training frame of the set of training multidimensional frames.

6. The apparatus of claim 5, wherein each latent variable value set comprises a one-dimensional array of values, and each value of each one dimensional array of values to correspond to a dimension in a training frame.

7. The apparatus of claim 1, the memory comprising instructions that when executed by the processor to cause the processor to utilize a second machine learning model to train a classifier to compute the set of correlation scores, wherein the classifier is trained on a set of training latent space representations generated with the trained encoder based on a set of training 3D frames.

8. A computer-implemented method, comprising:

determining a multidimensional frame based on a data object, the multidimensional frame comprising a row dimension, a column dimension, and a contents dimension;

adding padding to one or more dimensions of the multidimensional frame based on metadata included in the data object that indicates one or more characteristics of the multidimensional frame;

utilizing a trained encoder to embed the multidimensional frame into a latent space representation, wherein the trained encoder is trained with a machine learning model to generate latent space representations of multidimensional frames;

computing a set of correlation scores for the latent space representation of the multidimensional frame, wherein each correlation score in the set of correlation scores corresponds to a different latent space representation of a different multidimensional frame generated based on a different data object;

comparing the set of correlation scores to a correlation threshold to identify a set of correlated latent space representations;

identifying a set of correlated data objects to the data object based on the set of correlated latent space representations; and providing the set of correlated data objects as output.

9. The computer-implemented method of claim 8, comprising generating the trained encoder with the machine learning model, wherein the trained encoder comprises a neural network trained on a set of training multidimensional frames.

10. The computer-implemented method of claim 9, wherein the machine learning model comprises an autoencoder.

11. The computer-implemented method of claim 9, wherein the trained encoder to identify patterns in the set of training multidimensional frames, the identified patterns in the set of training multidimensional frames to enable the trained encoder to identify the latent space representations of multidimensional frames.

12. The computer-implemented method of claim 9, wherein the latent space representation comprises a latent variable value set for each training frame of the set of training multidimensional frames.

13. The computer-implemented method of claim 12, wherein each latent variable value set comprises a one-dimensional array of values, and each value of each one dimensional array of values to correspond to a dimension in a training frame.

14. The computer-implemented method of claim 8, comprising utilizing a second machine learning model to train a classifier to compute the set of correlation scores, wherein the classifier is trained on a set of training latent space representations generated with the trained encoder based on a set of training 3D frames.

15. At least one non-transitory computer-readable medium comprising a set of instructions that, in response to being executed by a processor circuit, cause the processor circuit to:

determine a multidimensional frame based on a data object, the multidimensional frame comprising a row dimension, a column dimension, and a contents dimension;

add padding to one or more dimensions of the multidimensional frame based on metadata included in the data object that indicates one or more characteristics of the multidimensional frame;

utilize a trained encoder to embed the multidimensional frame into a latent space representation, wherein the trained encoder is trained with a machine learning model to generate latent space representations of multidimensional frames;

compute a set of correlation scores for the latent space representation of the multidimensional frame, wherein each correlation score in the set of correlation scores corresponds to a different latent space representation of a different multidimensional frame generated based on a different data object;

compare the set of correlation scores to a correlation threshold to identify a set of correlated latent space representations;

identify a set of correlated data objects to the data object based on the set of correlated latent space representations; and provide the set of correlated data objects as output.

16. The at least one non-transitory computer-readable medium of claim 15, comprising instructions that, in response to being executed by the processor circuit, cause the processor circuit to generate the trained encoder with the machine learning model, wherein the trained encoder comprises a neural network trained on a set of training multidimensional frames, wherein the machine learning model comprises an autoencoder.

17. The at least one non-transitory computer-readable medium of claim 16, wherein the trained encoder to identify patterns in the set of training multidimensional frames, the identified patterns in the set of training multidimensional frames to enable the trained encoder to identify the latent space representations of multidimensional frames.

18. The at least one non-transitory computer-readable medium of claim 16, wherein the latent space representation comprises a latent variable value set for each training frame of the set of training multidimensional frames.

19. The at least one non-transitory computer-readable medium of claim 18, wherein each latent variable value set comprises a one-dimensional array of values, and each value of each one dimensional array of values to correspond to a dimension in a training frame.

20. The at least one non-transitory computer-readable medium of claim 10, comprising instructions that, in response to being executed by the processor circuit, cause the processor circuit to utilize a second machine learning model to train a classifier to compute the set of correlation scores, wherein the classifier is trained on a set of training latent space representations generated with the trained encoder based on a set of training 3D frames.

* * * * *